UNITED STATES PATENT OFFICE.

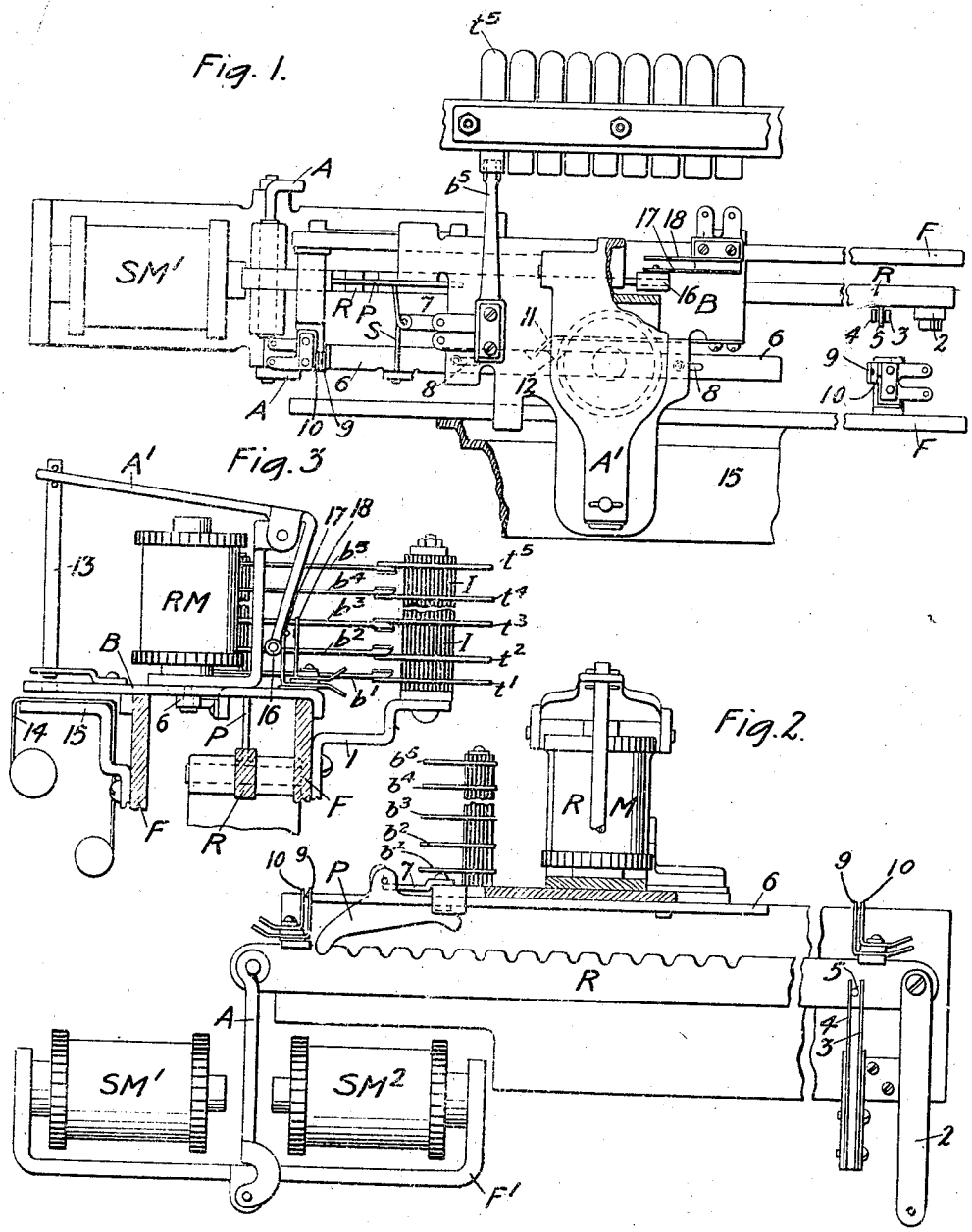

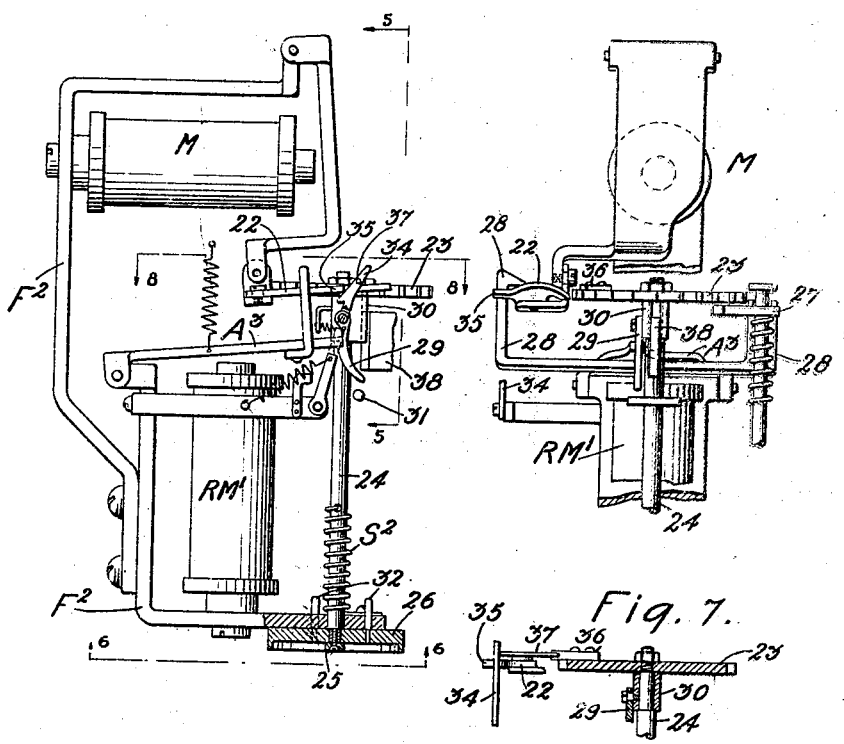

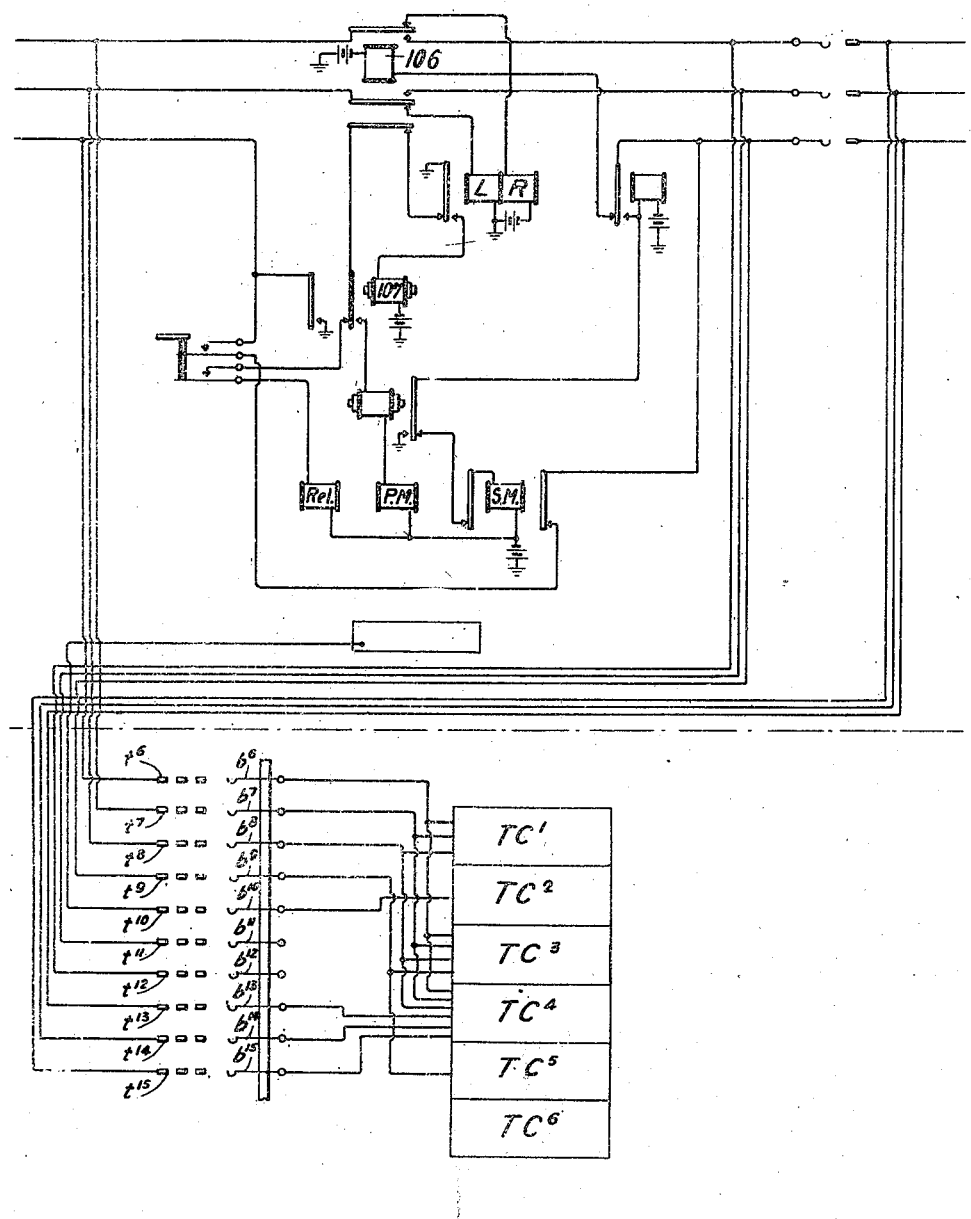

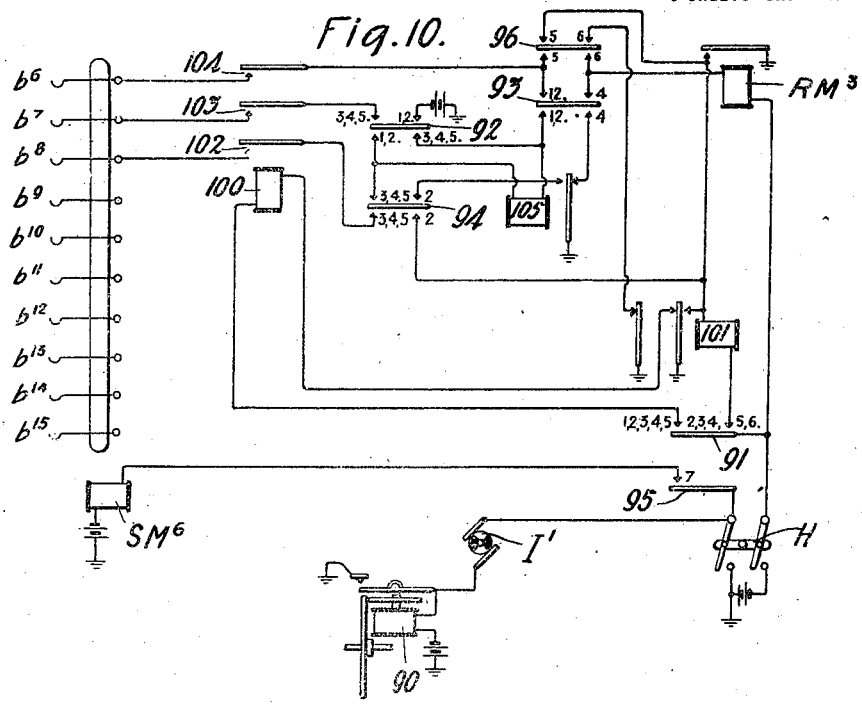
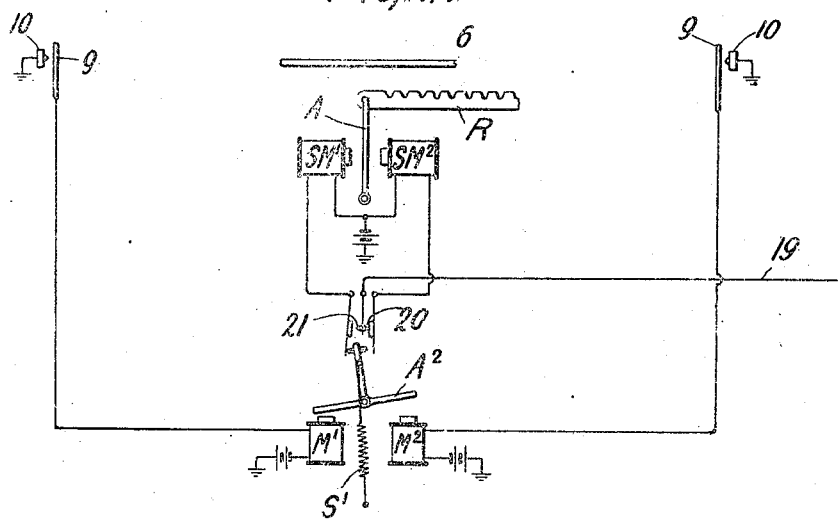

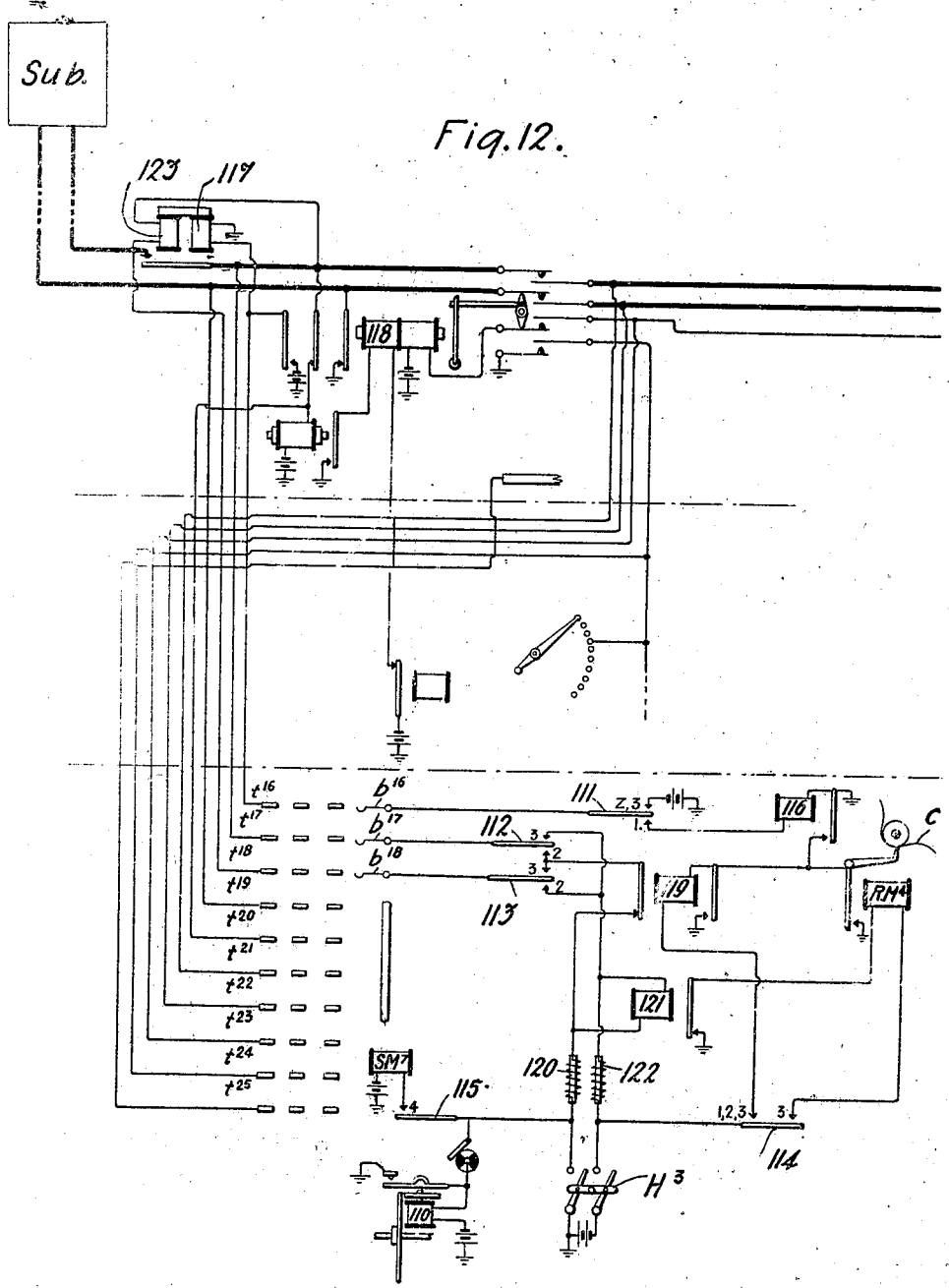

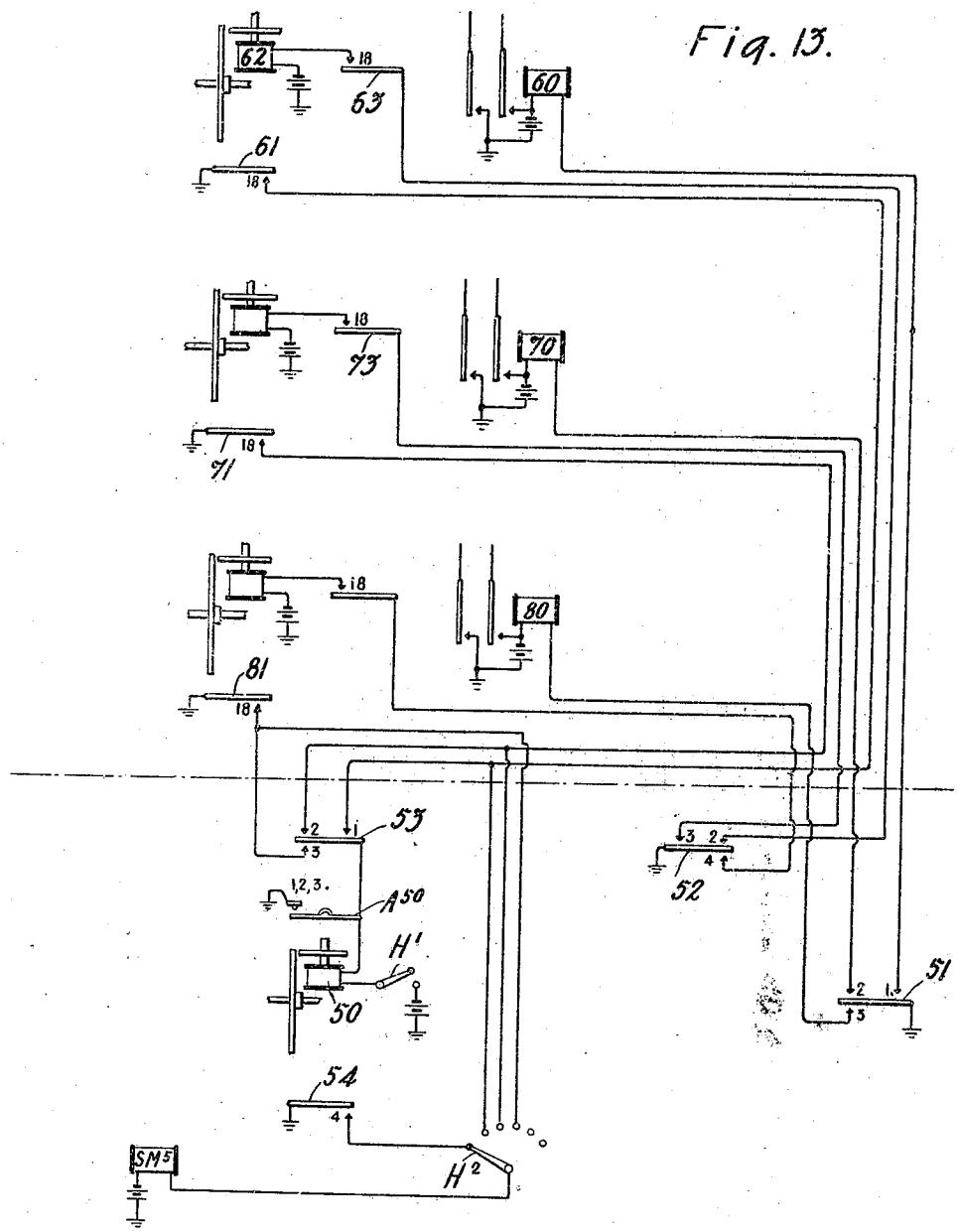

HENRY P. CLAUSEN, OF MOUNT VERNON, NEW YORK, ASSIGNOR TO WESTERN ELECTRIC COMPANY, INCORPORATED, OF NEW YORK, N. Y., A CORPORATION OF NEW YORK.

ELECTRICAL TESTING SYSTEM.

1,263,377.  Specification of Letters Patent.  Patented Apr. 23, 1918.

Application filed February 17, 1917. Serial No. 149,238.

*To all whom it may concern:*

Be it known that I, HENRY P. CLAUSEN, a citizen of the United States, residing at Mount Vernon, in the county of Westchester and State of New York, have invented certain new and useful Improvements in Electrical Testing Systems, of which the following is a full, clear, concise, and exact description.

This invention relates to electrical testing systems for use in telephone exchange systems, and has for its object the provision of means for automatically making routine tests of various parts of telephone systems.

In telephone exchange systems where automatic switches are used it is important that frequent tests of the apparatus be made to determine whether or not such apparatus is in a standard or an unstandard condition.

Heretofore there have been devised circuits and apparatus for making specific routine tests, such, for instance, as those noted in the hereinafter mentioned pending patent applications. There are a certain number of important testing points in the circuits of the automatic switches upon which such tests are made, hence the use of separate circuits for making each routine test is impractical for it results in a duplication of testing wires and apparatus, and makes the cost of the system prohibitive from a commercial standpoint.

The present invention contemplates a master testing device in which various tests are performed by a composite structure either singly or otherwise.

Specifically the invention resides in a switching device which successively brings a plurality of brushes into association with sets of fixed contacts, each of which sets is connected to certain important testing points in the apparatus to be tested. A number of testing circuits are connected to the brushes and an auxiliary switching device causes the successive functioning of each test circuit. After the completion of the full series of tests, the brushes are automatically moved forward into association with the next set of terminals. The successive movement of the brushes is continuous in both the forward and reverse directions, and thus the apparatus connected to each set of terminals is periodically subjected to a test.

A feature of the invention is the provision of means for causing this device to perform all of the tests for which it is arranged in succession or only one of such tests. In the latter case the means for advancing the brushes is removed from the control of the auxiliary switching device and placed directly under the control of the one testing circuit which is to function.

The following testing operations are a few of those which may be performed by such a master testing device:

1. Determining whether line switch or selector switch frames are grounded or crossed with battery.
2. Determining the operative condition of line switches and making marginal tests on the same.
3. Testing certain conductors for opens.
4. Testing for accuracy of adjustment and general operation.
5. Testing telephone lines for insulation resistance.
6. Determining operative condition of message registers.
7. Making peg counts of incoming and outgoing traffic.
8. Locating receiver off the hook and placing a howler signal upon the line.
9. Making busy and barring against incoming calls faulty switch or trunk circuits.

A description of the specific method of making the first of the above tests is contained in Patent No. 1,251,750, granted to H. P. Clausen, January 1, 1918.

A description of tests on the line and cut-off relay and other apparatus connected with the subscriber's line is contained in Patent No. 1,232,498, granted to H. P. Clausen, July 10, 1917. The principle there disclosed may with equal facility be applied to line switches and line finder switches for making tests to determine the operative condition of the same.

Testing conductors for opens has been disclosed in one phase in Patent No. 1,220,607, granted to H. P. Clausen, March 27, 1917. In another of its phases it will be disclosed in the present application.

The fourth of the above mentioned tests has been fully described in Patent No. 1,246,548, granted to H. P. Clausen, November 13, 1917.

The test for insulation resistance of a line is described in Patent No. 1,232,498, before mentioned.

A method of and apparatus for determining the operative condition of message registers is disclosed in the present invention.

A method of and apparatus for making a peg count of traffic conditions is the basis of Patent No. 1,251,475, granted to H. P. Clausen, January 1, 1918.

A description of the method of and apparatus for locating a receiver off the hook and for placing a howler upon the line forms the basis for Patent No. 1,224,140, granted to H. P. Clausen, May 1, 1917.

The last of the above mentioned tests is disclosed in Patent No. 1,237,477, granted to H. P. Clausen, August 21, 1917.

Other tests and modifications of the above may be performed by the apparatus described herein without departing from the spirit of the invention.

In the drawings Figure 1 is a plan view; Fig. 2 is a side elevation, and Fig. 3 is a front elevation of the structural details of a step-by-step switch which is suitable for use in the present invention; Fig. 4 is a side view of a registering device which may be employed in connection with the step-by-step switch; Fig. 5 is a front view of the same; Fig. 6 is a bottom view showing in detail the marking member; Fig. 7 is a detail view of part of the mechanism for actuating the marking mechanism; Fig. 8 is a top view of the same; Fig. 9 is a diagrammatic representation of an automatic connector switch showing the manner in which ten important testing points are connected to the terminals of the testing device of the present invention; Fig. 10 shows a specific circuit for testing for open trunk circuits and shows in detail that part of Fig. 9 which is indicated by the rectangle designated TC¹; Fig. 11 shows in detail a circuit for the stepping magnet of the step-by-step switch; Fig. 12 is a diagrammatic representation of a well-known type of line switch showing the manner in which ten important testing points are connected to the terminals of the master testing device of the present invention. The part below the lower broken line represents a circuit by means of which the message register within the line switch is tested; and Fig. 13 is a diagrammatic representation of means by which the master testing device may be caused to perform a number of separate tests on a piece of apparatus in sequence or a certain one of such separate tests.

*General description of master testing device.*

The master testing device is a step-by-step mechanism through which brushes are successively moved into contact with fixed terminals both in a forward and reverse direction. As shown in Figs. 1, 2 and 3, the device consists of a frame F upon which is slidably mounted a carriage consisting of a bed plate B and the various pieces of apparatus to be hereinafter described. Secured to the frame F is a bracket 1 upon which in turn are mounted the terminals $t^1$ to $t^5$ suitably insulated from each other by the strips of insulation I. Brushes $b^1$ to $b^5$ are mounted upon the bed plate B and are so arranged that each forward step of the bed plate B will bring a set of brushes into operative relation with the next set of terminals. Secured to the frame F is a bent metal piece, designated as $F^1$, upon which are mounted the two magnets $SM^1$ and $SM^2$. These magnets have a common armature A, one end of which is pivotally attached to the frame $F^1$ and the other end pivotally secured to one end of a rack R. The other end of the rack R is pivotally secured to a member 2 of the same length as the armature A and secured in the same way to the frame F so that the motion of the rack R is such that it will in each of its positions be parallel to its normal position. Secured to the frame F are two springs 3 and 4 which coöperate with a pin 5 mounted on the rack R. Springs 3 and 4 work against the force of the magnets $SM^2$ and $SM^1$ but are not strong enough to prevent such magnets from attracting their armature A. They serve when such magnets are deënergized to return the rack R to its normal position.

The rack R is provided with a series of teeth with which one or the other extremities of the pawl P coöperates. In the position shown, and for the reason to be explained later, the bed plate B and the apparatus mounted thereon is in its extreme left-hand position and the brushes $b^1$ to $b^5$ are in contact with the first set of terminals $t^1$ to $t^5$. The left-hand extremity of the pawl P is in coöperation with the first tooth of the rack R and the circuit condition is such that magnet $SM^2$ will be energized when the brushes are next required to be moved. The energization of this magnet attracts the armature A to the right and through the agency of the pawl P the bed plate B is moved one step to the right so that the brushes $b^1$ to $b^5$ are brought into engagement with the second set of terminals $t^1$ to $t^5$. Upon the deënergization of magnet $SM^2$ the force of the spring 3 exerted on the pin 5 returns the rack R to its normal position and the left-hand extremity of the pawl P drops into the second tooth of the rack R.

The pawl is pivotally attached to the bed plate B and held in the position shown, through the agency of a spring S which is secured at one end to the pawl P, at the other end to the sliding member 6, and pivoted in its central portion to a member 7 secured to the bed plate B. The sliding member 6 is loosely riveted to the under side of the bed plate B and provided with two slots 8 in such a manner that pressure exerted on its left-hand extremity will cause it to move to the right in relation to the bed plate B or pressure exerted on its right-hand extremity will cause it to move to the left in relation to the bed plate B.

Under successive energizations of magnet $SM^2$ the brushes $b^1$ to $b^5$ are caused to traverse in turn each set of terminals $t^1$ to $t^5$ and when the last is reached the member 6 makes physical contact with the contact spring 9, which moving a very small distance makes physical and electrical contact with the non-resilient stop member 10 through which a circuit is closed and through which the member 6 is also caused to move toward the left. The result of the making of an electrical contact between the members 9 and 10, as will be explained later, is to cause the magnet $SM^1$ to be energized thereafter in place of the magnet $SM^2$. Spring member 11 is securely attached to the bed plate B and coöperates with the sliding member 6 through two notches 12 in such a manner that this member is securely held in its transferred position against the slight pressure of the spring S until again transferred through physical contact with the members 9 and 10. The movement of the member 6, as described, now causes the spring S to exert its pressure in the opposite direction so that the pawl P is oppositely inclined and its right-hand extremity now engages the teeth of the rack R.

Mounted on the bed plate B is one form of recording magnet RM. The armature A′ of this magnet actuates a member 13 which descends upon a chart 14 on the platen 15 for a purpose to be hereinafter described. Attached to one end of the armature A′ is an insulated piece 16 which actuates the contact members 17 and 18 for a purpose also to be hereinafter described.

The circuit for operating this master testing device is shown in Fig. 11. An impulse arising from a connection to ground and the conductor 19, travels over this conductor through the contact 20, the winding of magnet $SM^2$, to battery and ground, whereupon the magnet $SM^2$ attracts its armature A and moves the rack R and the brushes $b^1$ to $b^2$ therethrough into association with the next set of terminals $t^1$ to $t^5$. When the brushes have completed their full travel the member 6, as explained, makes physical contact with the members 9 and 10 and at the same time establishes an electrical contact, which closes a circuit from ground, through members 10 and 9, the magnet $M^2$ to battery, and thence to ground. The magnet $M^1$ attracts its armature $A^2$ which is thereafter held in its new position through the spring $S^1$ until later moved in a similar manner by the magnet $M^1$. The movement of armature $A^2$ causes the transfer of the conductor 19 from connection over the contact 20 to the contact 21 and through the winding of magnet $SM^1$ to battery and ground, so that impulses arising later upon the conductor 19 cause the movement in the opposite direction of the rack R.

*Detailed operation of recorder.*

Figs. 4 to 8 inclusive represent the preferred form of the recording mechanism controlled by magnet RM. This form is shown separately from the first three figures for the sake of clearness.

A frame $F^2$ may be attached to the bed plate B of Fig. 1. Mounted on this frame $F^2$ are two magnets $RM^1$ and M. Magnet M is designed to receive an impulse for each movement of the sequence switch of the testing device as will hereinafter be described. The armature of magnet M through a pawl 22 engages the teeth of the ratchet wheel 23 to which, through a shaft 24, is securely attached a stamping hand 25. This stamping hand then, under the influence of magnet M, revolves within the circular stamping member 26, provided with raised numerals 1, 2, 3, etc., and points to one or another of these numerals. The circuit arrangements are such that as the sequence switch spoken of moves from position 1 to position 2 the magnet $M^2$ is energized and causes the stamping hand 25 to move from a position where it points to 1 to a position where it points to 2, and so on. A pawl 27 is provided to engage the teeth of the ratchet wheel 23 and hold it in its actuated position against the force of the coiled spring $S^2$ until restoration takes place.

The magnet $RM^1$ is provided with an armature $A^3$ to which is attached a member 28 bent up and formed into a hook which extends over the pawl 22 in such a manner that upon the actuation of armature $A^3$ the pawl 22 will be forced out of engagement with the teeth of the ratchet wheel 23. The other end of the member 28 is bent up and around in a fashion to control the pawl 27, which it also forces out of engagement with the teeth of ratchet wheel 23 when the armature $A^3$ is actuated.

The extremity of the armature $A^3$ engages a suitable notch on the member 29 pivoted to a collar 30 secured to the shaft 24. As the armature $A^3$ descends and thereby carries the apparatus which is secured to the shaft 24, the member 29 comes into engagement with the pin 31 and is thereby thrown out of engagement with the armature $A^3$. Through the upward thrust of the spring $S^2$, which it will be noted has a double function in this apparatus, the stamping member 25 and associated member 26 will return to their normal positions. It should be noted that the member 26 is held in fixed relationship to the frame $F^2$ through the pins 32, but is caused to move downward with the member 25 through the thrust of the shaft 24. The pin 31 and the latch 29 are so fashioned that before the point is reached where the members 25 and 26 are returned to their normal position, they are pressed firmly against a platen and thereby leave an impression on a chart which indicates the position of the associated sequence switch when the recording operation took place.

When the shaft 24 returns to normal the ratchet wheel 23 is freed from the pawl 27 which is held down in the position shown in Fig. 5. Under the influence of the spring $S^2$ the member 25 returns to its normal position, and when the armature 23 is released the pawl 27 in ascending again comes into association with the teeth of the ratchet wheel 23 through an enlarged tooth 33 cut especially in the normal position for the purpose of allowing such reëngagement.

It should be noted at this point that a latch 34 is provided to coöperate with a projection 35 of the pawl 22 so that when the pawl 22, under the influence of the armature $A^3$, is moved downward, this latch engages the pawl and holds it down until the ratchet wheel 23 has resumed its normal position. At this time a stop member 36 engages a pin 37 of the latch 34 and thereby disengages the latch from the pawl 22.

It should also be noted that the collar 30 is loosely mounted on the shaft 24 so that when the shaft 24 rotates the collar 30 remains stationary, being held in this position by a member 38 associated therewith.

*Description of control circuit of master tester.*

In the beforementioned patents, certain circuits useful in testing for unstandard conditions in telephone apparatus have been described. It will be noticed that in each a sequence switch of a type described in U. S. Patent 1,127,808 is used. This sequence switch comprises a motor magnet through which a spindle carrying a number of contactors is rotated. These contactors are illustrated in the present drawings as 51 and 52 in Fig. 13. In such cases the contacts are adapted to be closed only in such positions of the sequence switch as are indicated by the numerals placed beside the contact points. Each sequence switch is provided with a contact such as $A^{50}$ which is adapted to be opened only in the positions indicated by the numerals adjacent to the contact points. Each testing device is also provided with a hand switch such as H in Fig. 10, and a magnet SM which is adapted in a certain position of the associated sequence switch to move the brushes of the testing device forward.

The master testing device is one in which all routine tests for unstandard conditions on a certain piece of apparatus may be made. In Fig. 9, ten important testing points in a selector switch are connected to the terminals of such a master tester, and the brushes coöperating with these terminals are connected to separate testing circuits as indicated by the rectangles $TC^1$, $TC^2$, $TC^3$, $TC^4$ and $TC^5$.

The circuit $TC^1$ is adapted to make one or more specific tests on the selector switch. The circuit $TC^2$ is adapted to make a test of a different nature on the same selector switch and in like manner the other testing circuits indicated are adapted to perform certain other separate testing operations. In order that the master tester may perform first one and then the others in succession, the circuit illustrated in Fig. 13 is provided. The hand switch H of the separate testing circuit is replaced by the contacts of a relay such as 60, 70, 80, etc. The conductor, connected in each case to the stepping magnet SM, is replaced by a conductor leading from sequence switch contacts 61, 71, 81, etc., to a sequence switch contact 53, and instead of causing the brushes $b^1$ to $b^5$ to be advanced to the next set of terminals the closure of the contacts 61, 71, 81, etc., causes the master sequence switch 50 to advance the test from that made by the circuit indicated at $TC^1$ to that made by the circuit indicated at $TC^2$.

The operation is as follows:

The hand switches $H^1$ and $H^2$ are actuated. $H^2$ being thrown into engagement with its first contact. A circuit is then established from ground, the sequence switch contact 51 (position 1), the winding of relay 60, to battery, and ground. The relay 60 is energized and, attracting its armatures, functions in the same manner as the hand switch 8 of Fig. 10, which will hereinafter be described, or the hand switch H of several of the beforementioned copending patent applications. The testing circuit supervised by the relay 60 then performs its duties and the associated sequence switch 62 having successively passed through its several positions, and the test being completed, arrives in what will here be styled position 18, that being the position just before normal. A circuit is thereupon established from ground, the sequence switch contact 61 (position 18), the sequence switch contact 53 (position 1), winding of sequence switch 50 through the hand switch $H^1$, to battery and ground. The sequence switch 50 moves its contactors into position 2, whereupon a circuit is established from ground, the sequence switch contact 52 (position 2), sequence switch contact 63 (position 18), the winding of sequence switch 62, to battery and ground. The sequence switch 62 moves into its normal position.

The movement of sequence switch 50 from position 1 to position 2 causes the deënergization of relay 60 and the energization of relay 70 through a circuit which extends from ground, sequence switch contact 51 (position 2), the winding of relay 70, to battery, and ground. The testing circuit supervised by relay 70 now performs its duties in a similar manner to that described above, and upon the completion of this test a circuit is established from ground, sequence switch contact 71 (position 18), sequence switch contact 53 (position 2), the winding of motor magnet of sequence switch 50, hand switch $H^2$, to battery and ground. The sequence switch 50 moves its contactors from position 2 to position 3, whereupon the relay 70 is deënergized and the sequence switch 72 moved into its normal position, and the relay 80 is energized.

In this manner then, the separate tests made by the separate testing circuits, such as $TC^1$, $TC^2$, $TC^3$, $TC^4$ and $TC^5$, are made in succession and upon the completion of the last, circuit is established from ground to sequence switch contact 54 (position 4), hand switch $H^2$, the winding of stepping magnet $SM^5$ to battery, and ground. Stepping magnet $SM^5$ causes the movement of the brushes $t^1$ to $t^5$ in the manner hereinbefore described. It should be noted that the position in which the sequence switch contact 54 is closed depends on the number of testing circuits which the master sequence switch 50 controls.

Should it be desired to cause the energization of the stepping magnet $SM^5$ after the first test made by the testing circuit such as $TC^1$ is completed, then the hand switch $H^2$ is set on the second of these contacts and the hand switch $H^1$ is thrown to its off-normal position. The ground projected in this case over the conductor leading from the sequence switch contact 61, instead of causing the movement of the sequence switch 50, causes the energization of magnet $SM^5$ over a circuit extending from ground, sequence switch contact 61 (position 18), second contact of hand switch $H^2$ through the conductor member of hand switch $H^2$, the winding of stepping magnet $SM^5$, to battery and ground. In such a case the sequence switch 50 must be left in position 1 so that the relay 60 will be continually energized.

The separate test supervised by the relay 70 may be made by stopping the sequence switch 50 in position 2, opening the hand switch $H^1$ and placing the hand switch $H^2$ on the third of its contacts whereby the control of the magnet $SM^5$ is had by the sequence switch 72 over its contact 71.

*Arrangement of separate testing circuits within the master tester.*

Referring now especially to Figs. 9 and 10 and especially to that part of Fig. 9 below the broken line, the brushes $b^6$ to $b^{15}$ inclusive are arranged in operative relation to the sets of terminals $t^6$ to $t^{15}$ respectively. The apparatus represented by the rectangles $TC^1$ to $TC^6$ inclusive is connected to the brushes $b^6$ to $b^{15}$ inclusive, each one representing a separate testing circuit such, for instance, as that shown in Fig. 10. Fig. 10, in fact, is represented by the first of these rectangles $TC^1$ and it will be seen, therefore, that by the aid of the circuit and apparatus diagrammatically represented in Fig. 10 a test on the selector switch diagrammatically represented in the part of Fig. 9 above the broken line may be made through the conductors connected to the terminals $t^6$, $t^7$ and $t^8$.

The rectangle $TC^2$ represents the circuit described in the beforementioned Patent No. 1,251,750, which application discloses means for testing the frame of telephone apparatus for crosses with battery or ground.

The testing circuit represented by the rectangle $TC^3$ may be that described in the beforementioned Patent No. 1,224,140.

The testing circuit represented by the rectangle $TC^4$ may be that described in the beforementioned Patent No. 1,246,548.

The testing circuit represented by the rectangle $TC^5$ may be that described in the beforementioned Patent No. 1,251,475.

The testing circuit represented by the rectangle $TC^6$ may be for some other testing circuit to perform some other routine test and may be connected to the brushes $b^6$ to $b^{15}$ in any manner desired.

*Description of circuit for testing trunks for openings.*

Referring to Figs. 9 and 10 in conjunction, it will be assumed that the brushes $b^6$, $b^7$ and $b^8$ are resting on the terminals $t^6$, $t^7$ and $t^8$ connected to the selective switch shown in the upper part of Fig. 9. The hand switch H is thrown to its actuated position and thereby establishes a circuit from ground, the left-hand member of hand switch H, through the interrupter $I^1$, the motor magnet of sequence switch 90, to battery, and ground. Under the influence of the constantly moving interrupter $I^1$ the sequence switch moves its contactors successively through their different positions. In the first position a circuit is established from ground, battery, right-hand member of hand switch H, sequence switch contact 91 (position 1), the winding of relay 100, the normal contact and inner armature of relay 101, to ground. Relay 100 is energized in this circuit and causes its armatures to close the contacts 102, 103 and 104. A circuit is thereby established from ground, battery, sequence switch contact 92 (positions 1 and 2), winding of relay 105, sequence switch contact 93 (positions 1 and 2), contact 104, brush $b^6$, terminal $t^6$, to the release trunk of the selector switch.

Should this selector switch be busy such standard busy condition will be signified by a ground on this release trunk, in which case current passing over the circuit just traced to such ground will cause the energization of relay 105, whereupon it will attract its armature and when position 2 is reached will establish a circuit from ground, armature and alternate contact of relay 105, sequence switch contact 94 (position 2), winding of relay 101, sequence switch contact 91 (position 2), right-hand portion of hand switch H, to battery and ground. Relay 101 will thereupon attract its armature and establish a locking circuit for itself from ground, inner armature and alternate contact of relay 101, winding of relay 101, and thence over the circuit previously traced to battery. At the same time the energizing circuit for relay 100 is opened at the inner armature and normal contact of relay 101, and the contacts 102, 103 and 104 are opened. Relay 101 will remain energized until the seventh position of the sequence switch is reached, in which position a circuit will be established from ground, the left-hand member of hand switch H, sequence switch contact 95 (position 7), winding of stepping magnet $SM^6$, to battery and ground. The stepping magnet $SM^6$ causes the advance of the brushes $b^5$ to $b^{15}$ inclusive.

If the selector switch, shown in the upper part of Fig. 9, is not busy, then no circuit for the relay 105 will be established and the sequence switch 90 in passing its contactors into the third position will establish a new circuit extending from ground, the left-hand winding of relay LR, the normal contact and innermost lower armature of relay 106, the terminal $t^8$, the brush $b^8$, contact 102, sequence switch contact 94 (positions 3, 4, 5), the winding of relay 105, the sequence switch contact 92 (positions 3, 4 and 5), contact 103, brush $b^7$, terminal $t^7$, the upper armature and normal contact of relay 103, the right-hand winding of relay LR, to battery, and ground. If the trunk is in a standard condition the establishment of this circuit will result in the energization of relays 105 and LR. The energization of relay LR establishes a circuit from ground, the armature and alternate contact of relay LR, the winding of relay 107, to battery, and ground. Relay 107 attracts its armatures and establishes a circuit from ground, the outer armature of relay 107, the release trunk of this selector switch, terminal $t^6$, brush $b^6$, contact 104, sequence switch contact 96 (position 5), winding of relay 101, sequence switch contact 91 (position 5), right-hand member of hand switch H, to battery, and ground. Relay 101 attracts its armatures and, in the manner hereinbefore described, causes the abandonment of any further test on this selector switch.

If, on the other hand, the trunk leading to this selector switch is in an unstandard condition such, for instance, as an open conductor between either winding of the line relay LR and the point in the trunk where the connection to the terminals $t^7$ and $t^8$ is made, then neither relay LR nor 105 will be energized. In this case, when position 4 is reached a circuit will be established from ground, the armature and normal contact of relay 105, sequence switch contact 93 (position 4), the winding of recording magnet $RM^3$, right-hand member of hand switch H, to battery and ground. The recording of magnet $RM^3$ attracts its armature and by so doing makes a record of the detected unstandard condition and closes a circuit which extends from ground, the armature and contact of relay $RM^3$, winding of relay 101, sequence switch contact 91 (position 4), right-hand member of hand switch H, to battery, and ground. Relay 101 will thereupon attract its armatures and cause the abandonment of further tests on this trunk, as hereinbefore described.

If again, the two talking conductors in the trunk had been in a standard condition, but the release trunk in an unstandard condition, then the ground projected thereover from the outer armature and contact of relay 107 would not have caused the energization of relay 101, as described, and the sequence switch arriving in position 6, a circuit would have been established from ground, the outer armature and contact of relay 101, sequence switch contact 96 (position 6), winding of release magnet $RM^3$ and thence over the circuit previously described. The action thereafter may be similar to that in the previous case, that is, a record may be made of the unstandard condition and the apparatus caused to advance until the stepping magnet $SM^6$ is energized.

It should be noted in this case that position 7 of the sequence switch 90 is that in which the stepping magnet $SM^6$ is energized, and if this circuit were to be used as the first shown in Fig. 13 where the sequence switch contact 61 represents the sequence switch contact 95 in this case, then the sequence switch contact 61 would be closed in the seventh position, and the sequence switch contact 63 would be closed in all positions from the seventh until a normal position is reached.

*Description of circuit for testing message registers.*

In order to illustrate the application of the master testing device to various pieces of telephone apparatus it has been shown in Fig. 12 how a message register in a well-known type of line switch can be tested.

The terminals $t^{16}$ to $t^{25}$ inclusive are connected to ten important testing points in a line switch, the first three being used for the test of the message register. Coöperating with the first three terminals are the brushes $b^{16}$, $b^{17}$ and $b^{18}$.

In this test a hand switch $H^3$ similar to the hand switch H of Fig. 10 is actuated and a circuit is established in position 1 of the sequence switch 110, which extends from ground through the winding of relay 116, sequence switch contact 111 (position 1), brush $b^{16}$, terminal $t^{16}$, thence to a point where the circuit divides, extending in one direction through the coil 117 of the message register, to ground and in the other direction to the outer armature of relay 118. If the line switch is busy then the contact of this armature will be closed in the well-known manner, and the circuit will then extend in this direction to battery and ground. In this case, the relay 116 will be energized and will establish a circuit from ground, armature and contact of relay 116, the winding of relay 119, sequence switch contact 114 (position 1), the right-hand member of hand switch $H^3$, to battery and ground. Relay 119 will be energized in this circuit and will establish an alternate circuit for itself extending from ground, armature and contact of relay 119, winding of relay 119, and thence over the circuit previously traced to battery. At the same time a circuit is established from ground, left-hand member of hand switch $H^3$, the impedance coil 120, the winding of relay 121, the impedance coil 122, the right-hand member of hand switch $H^3$, to battery, and ground.

Relay 119 will now remain energized until position 4 is reached in which position the stepping magnet $SM^7$ will be energized over a circuit extending from ground, battery, the winding of relay $SM^7$, the sequence switch contact 115 (position 4), the left-hand member of hand switch $H^3$, to ground, and in the well-known manner will cause the advance of the brushes $b^{16}$, $b^{17}$ and $b^{18}$.

If, on the other hand, the line switch is not busy this relay 116 will not be energized, and when the sequence switch 110 moves its contactors into the second position a circuit will be established from ground, the left-hand member of hand switch $H^3$, the impedance coil 120, the contact and left-hand armature of relay 119, the sequence switch contact 112 (position 2), the brush $b^{17}$, the terminal $t^{17}$, the upper talking conductor of the line switch, the coil 123 of the message register, the terminal $t^{18}$, the brush $b^{18}$, the sequence switch contact 113 (position 2), the impedance coil 122, the right-hand member of hand switch $H^3$, to battery and ground. The magnet 123 is energized in this circuit but does not attract its armature on account of the opposed influence of the magnet 117, which is included this time in a circuit extending from ground, winding of magnet 117, terminal $t^{16}$, brush $b^{16}$, sequence switch contact 111, (position 2), to battery and ground. When position 3 is reached the arrangement of the sequence switch contacts 112 and 113 is such that the current flowing through the winding of coil 123 is reversed, whereupon the influence of magnet 123 is added to that of magnet 117, and the armature of the message register is actuated. Thereupon, the winding of relay 121 is short-circuited over a path leading from one terminal of relay 121, sequence switch contact 112 (position 3), the brush $b^{17}$, terminal $t^{17}$, the armature and contact of the message register consisting of the two magnets 117 and 123, the terminal $t^{18}$, the brush $b^{18}$, sequence switch contact 113 (position 3), the left-hand armature and contact of relay 119, to the other terminal of the relay 121. The relay 121 is thereupon deënergized and establishes a circuit from ground, armature and contact of relay 121, winding of recording magnet $RM^4$, sequence switch contact 114 (position 3), the right-hand member of hand switch $H^3$, to battery, and ground. The recording magnet $RM^4$ is energized in this circuit and attracting its armature makes a record on the proper portion of the message register on the chart C, at the same time it establishes a circuit from ground, contact and armature of recording magnet $RM^4$, winding of relay 119, and thence over the circuit previously traced to battery. When position 4 is reached the stepping magnet is energized to advance the brushes $b^{16}$, $b^{17}$ and $b^{18}$ into association with the next set of terminals.

It should be noted that in this case the functioning of the recording magnet is opposite to that had in previously mentioned cases. This is due to certain traffic requirements, since it is necessary to have a definite record of any tests made on message registering devices. The failure of the message register to attract its armature would, therefore, be indicated by the absence, rather than the presence, of a record upon the chart C which, for the purpose of illustration, is satisfactory.

What is claimed is:

1. In an electrical testing system, sets of fixed contacts, brushes arranged in operative relation to said contacts, like circuits connected to said sets of contacts, a plurality of testing circuits for detecting unstandard conditions connected to said brushes, means in each of said testing circuits responsive to a characteristic electrical condition in said circuits indicating an unstandard condition, a mechanism for recording the detection of an unstandard condition controlled by said responsive means, means for successively and automatically making each of said testing circuits operative, and means for successively and automatically moving said brushes into association with said sets of contacts.

2. In an electrical testing system, sets of fixed terminals, like circuits connected thereto, brushes arranged in operative relation to said terminals, a plurality of testing circuits for detecting unstandard conditions connected to said brushes, means included in each of said testing circuits responsive to a characteristic electrical condition indicating an unstandard condition, a mechanism for recording the detection of an unstandard condition controlled by said responsive means, means for successively and automatically making each of said testing circuits operative and for making only one of said testing circuits operative, and means for successively and automatically moving said brushes into association with said sets of terminals.

3. In an electrical testing system, sets of fixed terminals, like circuits connected thereto, brushes arranged in operative relation to said terminals, a plurality of testing circuits for detecting unstandard conditions in said circuits connected to said brushes, means included in each of said testing circuits responsive to a characteristic electrical condition indicating an unstandard condition, a mechanism for recording the detection of an unstandard condition controlled by said responsive means, means for automatically and successively making each of said testing circuits operative, means for preventing the operation of all except one of said testing circuits, and means for successively and automatically moving said brushes into association with said sets of terminals.

4. In an electrical testing system, sets of fixed terminals, like pieces of electrically connected apparatus connected thereto, brushes arranged in operative relation to said terminals, a plurality of testing circuits for detecting unstandard conditions in said apparatus connected to said brushes, means included in each of said testing circuits responsive to a characteristic electrical condition denoting an unstandard condition, means for identifying the piece of apparatus in which an unstandard condition has been detected, said means being under control of said responsive means, means for making any one of said testing circuits operative, and means for successively and automatically moving said brushes into association with said sets of terminals.

5. In an electrical testing system, sets of fixed terminals, like pieces of electrically connected apparatus connected thereto, brushes arranged in operative relation to said terminals, testing means for detecting unstandard conditions in said apparatus connected to said brushes, means responsive to a characteristic electrical condition on said terminals denoting the presence of an unstandard condition in said apparatus, means for identifying a piece of said apparatus in which an unstandard condition has been detected, said last means being under control of said responsive means, means for causing said testing means to successively test for several different unstandard conditions in said apparatus, means for causing said testing means to test for only one unstandard condition in said apparatus, and means for automatically and successively moving said brushes into association with said sets of terminals.

6. In an electrical testing system, sets of fixed terminals, electrically connected apparatus connected to said terminals, brushes arranged in operative relation to said terminals, means for testing for several different unstandard conditions in said apparatus, means responsive to a characteristic electrical condition on said terminals denoting an unstandard condition in said apparatus, means for recording the detection of an unstandard condition and identifying the apparatus in which said unstandard condition is detected, said last means being controlled by said responsive means, means for causing said testing means to test for several different unstandard conditions in succession, means for causing said testing means to test for only one of said several different unstandard conditions, and means for successively and automatically moving said brushes into association with said terminals.

7. In an electrical testing system, sets of fixed terminals, brushes arranged to travel over and make contact with said terminals, electrically connected apparatus connected to said terminals, testing means for detecting several different unstandard conditions in said apparatus connected to said brushes, means included in said testing means responsive to a characteristic electrical condition on said terminals denoting an unstandard condition in said apparatus, means controlled by said responsive means for preventing the further operation of said testing means upon the detection of an unstandard condition, means also controlled by said responsive means for recording said detected unstandard condition, for identifying the particular piece of apparatus in which said unstandard condition is detected and for identifying the particular unstandard condition detected, and means for successively and automatically moving said brushes into association with said sets of terminals.

8. In an electrical testing system, sets of fixed terminals, electrically connected apparatus connected thereto, brushes arranged in operative relation to said terminals, testing means for detecting and recording several different unstandard conditions in said apparatus connected to said brushes, said testing means being controlled by means responsive to changed electrical conditions on said terminals denoting unstandard conditions in said apparatus, and means for successively, repeatedly and automatically bringing said brushes into association with said terminals.

9. In an electrical testing system, sets of fixed terminals, electrically connected apparatus connected thereto, brushes arranged in operative relation to said terminals, testing means connected to said brushes for detecting and recording several different unstandard conditions in said apparatus, said testing means being controlled by means included therein responsive to changed electrical conditions on said terminals denoting unstandard conditions in said apparatus, and means for successively and automatically bringing said brushes into association with said terminals, said last means being constructed and arranged to cause said brushes to move in a continuous forward and reverse direction.

10. In an electrical testing system, sets of fixed terminals electrically connected apparatus connected thereto, brushes arranged in operative relation to said terminals, testing means connected to said brushes, means controlled by said testing means for recording an unstandard condition detected by said testing means, and means for successively and automatically moving said brushes into association with said sets of terminals, said last means being also constructed and arranged to automatically and periodically bring said brushes into association with said sets of terminals.

In witness whereof, I hereunto subscribe my name this 16th day of February, A. D. 1917.

HENRY P. CLAUSEN.